United States Patent
Bungo

(10) Patent No.: US 9,784,616 B2
(45) Date of Patent: Oct. 10, 2017

(54) SPECTROPHOTOMETER

(71) Applicant: SHIMADZU CORPORATION, Kyoto-shi, Kyoto (JP)

(72) Inventor: Hajime Bungo, Muko-shi (JP)

(73) Assignee: SHIMADZU CORPORATION, Kyoto-shi (JP)

( * ) Notice: Subject to any disclaimer, the term of this patent is extended or adjusted under 35 U.S.C. 154(b) by 0 days.

(21) Appl. No.: 14/580,489

(22) Filed: Dec. 23, 2014

(65) Prior Publication Data
US 2015/0219493 A1 Aug. 6, 2015

(30) Foreign Application Priority Data
Jan. 31, 2014 (JP) .................................. 2014-017331

(51) Int. Cl.
| | |
|---|---|
| G01J 3/42 | (2006.01) |
| G01J 3/10 | (2006.01) |
| G01J 3/18 | (2006.01) |
| G01J 3/28 | (2006.01) |
| G01J 3/02 | (2006.01) |

(52) U.S. Cl.
CPC ............... *G01J 3/10* (2013.01); *G01J 3/027* (2013.01); *G01J 3/18* (2013.01); *G01J 3/28* (2013.01); *G01J 3/2803* (2013.01); *G01J 2003/102* (2013.01)

(58) Field of Classification Search
CPC ...... G01J 3/10; G01J 3/42; G01J 3/027; G01J 3/18; G01J 3/28; G01J 3/2803; G01J 2003/102; H04L 7/00; G05F 1/10
See application file for complete search history.

(56) References Cited

U.S. PATENT DOCUMENTS

| | | | |
|---|---|---|---|
| 5,870,443 A * | 2/1999 | Rahnema | H04L 7/027 375/355 |
| 2009/0153855 A1* | 6/2009 | Bungo | G01J 3/02 356/319 |
| 2011/0133712 A1* | 6/2011 | Sasaki | H02M 3/157 323/283 |

FOREIGN PATENT DOCUMENTS

| | | |
|---|---|---|
| JP | 2011-149833 A | 8/2011 |
| JP | 2012-018011 A | 1/2012 |
| JP | 2012-032307 | 2/2012 |

(Continued)

*Primary Examiner* — Jamil Ahmed
(74) *Attorney, Agent, or Firm* — Westerman, Hattori, Daniels & Adrian, LLP

(57) ABSTRACT

Provided is a spectrophotometer having a sample container 30, a light-source unit 10 for casting measurement light into the sample container 30, a photodetector 40 for detecting light obtained from the sample container 30 illuminated with the measurement light, a light separator 20 placed between the light-source unit 10 and the sample container 30, an A/D converter 50 for converting detection signals from the photodetector 40 into digital signals, and an A/D conversion time controller 65 for controlling an A/D conversion time in the A/D converter 50. The A/D converter 50 receives, for each A/D conversion time, detection signals sequentially produced by the photodetector 40, and sequentially outputs values corresponding to the amounts of signals received. The A/D conversion time controller 65 controls the A/D conversion time at five times (preferably, ten times) the cycle of commercial power supplies or longer during wavelength-correctness validation of the light separator 20.

2 Claims, 7 Drawing Sheets

(56) References Cited

FOREIGN PATENT DOCUMENTS

JP       2013-015399 A    1/2013
WO      2013/145112 A1   10/2013

* cited by examiner

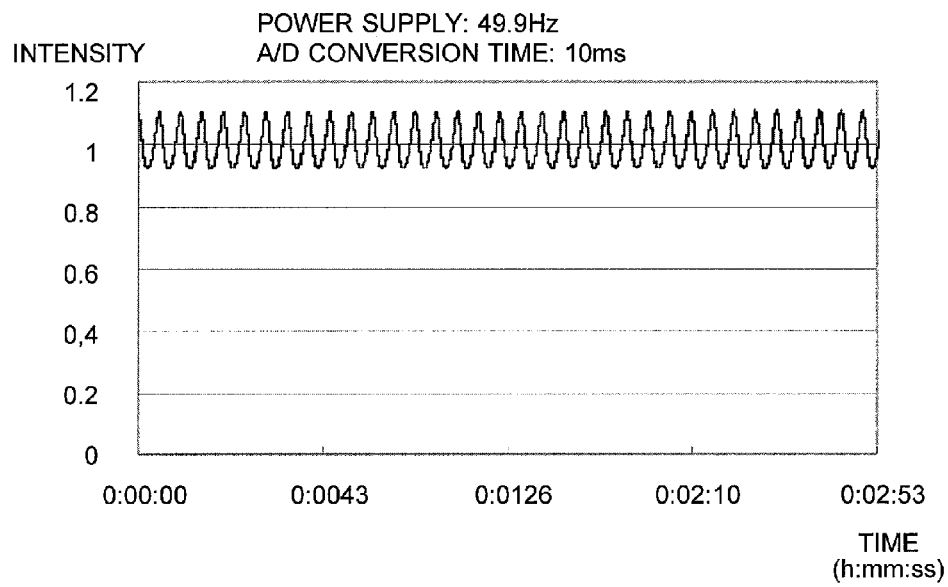
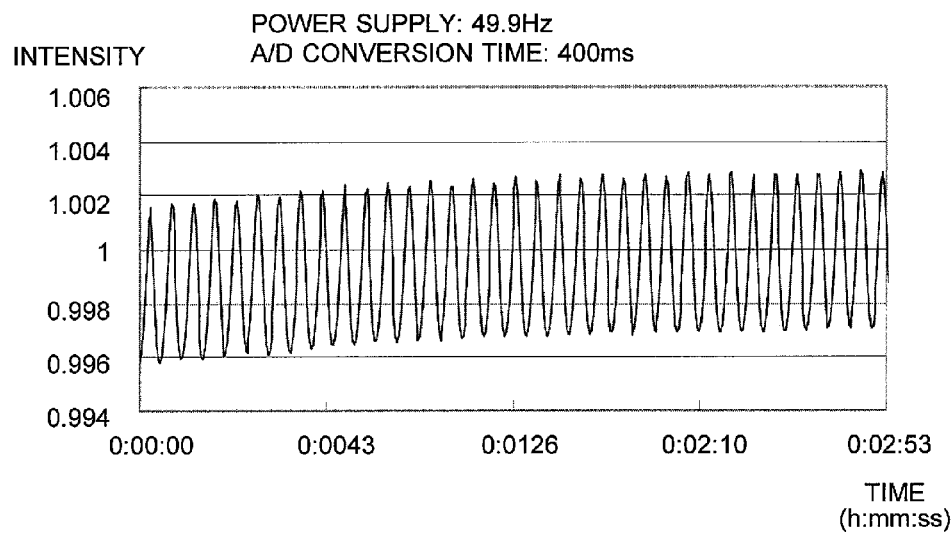

SPECTROPHOTOMETER

TECHNICAL FIELD

The present invention relates to a spectrophotometer.

BACKGROUND ART

In general, in a spectrophotometer, monochromatic light having a specific wavelength is extracted by introducing light emitted from a light source into a light separator, and this monochromatic light is cast onto or into a sample as measurement light. The wavelength of the light which interacts with the sample is specific to the substances contained in the sample. Accordingly, detecting the light after the interaction (e.g. transmitted, reflected, scattered or fluorescent light) with a photodetector enables quantitative and/or qualitative determination of the sample based on the detection signal, the wavelength of the cast light and other information.

For example, in a measurement of a sample using an ultraviolet-visible spectrophotometer, light emitted from a light source having a continuous spectrum over a comparatively broad range of wavelengths, such as a halogen lamp or deuterium lamp, is separated by a light separator, and measurement light having a preset wavelength is cast into a sample held in a sample cell. The light generated from the sample is detected by a photodetector. The thereby generated detection signal is sampled by an A/D converter and converted into digital data with a preset period. The obtained digital data are sent to a data processing system composed of a personal computer or similar device. A predetermined kind of data processing (e.g. creation of an absorption spectrum) is performed by the data processing system.

In the A/D converter, using a shorter sampling period enables a more precise digital conversion of analogue signals received from the photodetector. However, a problem exists in that the data size increases. Accordingly, taking into account the peak width of a measured waveform produced by the spectrophotometer, the sampling period is set at the largest possible value within a range where the waveform can be A/D converted with adequate precision (e.g. at approximately 10 ms for an ultraviolet-visible spectrophotometer used as a detector for a liquid chromatograph).

In the previously described type of ultraviolet-visible spectrophotometer, the setting of the wavelength of the measurement light is achieved by adjusting the rotational angle of the diffraction grating provided in the light separator. Since the correctness of the set wavelength of the light separator significantly affects the accuracy of the spectral analysis, it is necessary to regularly validate the "wavelength correctness." In a conventional process of validating the wavelength correctness of a light separator, light generated by a light source having an emission line at a known wavelength is introduced into the light separator, and the light exiting from the light separator is detected with a photodetector while the wavelength of light extracted by the light separator is continuously varied. Then, a spectrum with the horizontal axis indicating the wavelength and the vertical axis indicating the intensity of the received light is created, and an error of the set wavelength with respect to the true wavelength is calculated by comparing the peak position of the emission line on the spectrum and the true (theoretical) wavelength value of the emission line. This error represents the accuracy of the "wavelength correctness" in the light separator.

To guarantee the wavelength correctness over the entire measurement wavelength range of the spectrophotometer by the validation of the wavelength correctness, it is desirable to perform the previously described peak-position determination of the emission line at a plurality of points which are separated as widely as possible within the measurement wavelength range. In general, an ultraviolet-visible spectrophotometer is provided with a halogen lamp (for visible region) and a deuterium lamp (for ultraviolet region) as the light sources for sample measurement, allowing the two lamps to be selected according to the set wavelength. Among these light sources, the halogen lamp has no emission line within a wavelength region suitable for the validation. Therefore, normally, a low-pressure mercury lamp is additionally provided as a light source for validation (for example, see Patent Literature 1), and the validation of the wavelength correctness is performed using an emission line (253.7 nm) of this low-pressure mercury lamp and an emission line (656.1 nm) of the deuterium lamp.

CITATION LIST

Patent Literature

Patent Literature 1: JP 2011-149833 A (Paragraph [0003])

SUMMARY OF INVENTION

Technical Problem

Among the aforementioned light sources, the halogen lamp and the deuterium lamp are lighted by direct current, while the low-pressure mercury lamp is lighted by alternating current. Therefore, the emission intensity of the low-pressure mercury lamp fluctuates under the influence of the frequency of the AC power source. FIG. 9 shows an example of the temporal change in the emission intensity of a low-pressure mercury lamp lighted by a 60-Hz commercial power supply. The result shown in this figure was obtained by sampling the detection signals of a photodetector at intervals of 1 ms in a previously described type of ultraviolet-visible spectrophotometer while a low-pressure mercury lamp was lighted. In the shown example, the emission intensity of the low-pressure mercury lamp (the value on the vertical axis) fluctuated between 39,000 and 60,000, demonstrating an approximately 1.5-fold change in the light intensity at the frequency of the aforementioned commercial power supply.

When a sample is analyzed using an ultraviolet-visible spectrophotometer, the aforementioned problem of the fluctuation of the emission intensity corresponding to the frequency of the AC power supply does not occur since, as already explained, both the halogen lamp and the deuterium lamp used in the analysis are DC-energized light sources. By contrast, when the validation of the wavelength correctness is performed, the validation may not be properly performed since the low-pressure mercury lamp used for the validation is an AC-energized light source and its emission intensity fluctuates corresponding to the frequency of the AC power source. For example, consider the case of validating the wavelength correctness by a low-pressure mercury lamp whose emission intensity changes as shown in FIG. 9, using a 50-Hz commercial power supply, with a sampling period of 10 ms (or 20 ms). In this case, a slight change in the frequency of the commercial power supply from 50 Hz to 49.9 Hz causes a situation in which some signals are sampled at points in time where the emission intensity of the light source is maximized (i.e. at points in time corresponding to a value of 60,000 on the vertical axis in FIG. 9) while some other signals are sampled at points in time where the emission intensity of the light source is minimized (i.e. at points in time corresponding to a value of 39,000 on the vertical axis in FIG. 9). Consequently, the emission spectrum of the light source created based on the A/D-converted signals will be such that the signal intensity at the peak position of the emission line is lower than its actual level, which may possibly prevent correct determination of the position of the emission line.

Since the discrepancy in the peak position of the emission line in the previously described situation is slight, no special problem will arise if the required wavelength accuracy of the spectrophotometer is comparatively low. Meanwhile, in recent years, there has been a growing demand for a spectrophotometer with higher wavelength accuracy. For such high-accuracy spectrophotometers, even a slight discrepancy in wavelength due to the aforementioned fluctuation in the light intensity of the light source will cause a significant problem.

The present invention has been developed in view of the previously described point. Its objective is to provide a spectrophotometer capable of properly validating the wavelength correctness even if the emission intensity of the light source fluctuates.

Solution to Problem

A spectrophotometer according to one aspect of the present invention aimed at solving the previously described problem includes:
  a) a sample container in which a sample is to be placed;
  b) a light source for casting measurement light into the sample container;
  c) a photodetector for detecting light obtained from the sample container as a result of the casting of the measurement light;
  d) a light separator placed on a light path between the light source and the sample container or on a light path between the sample container and the photodetector;
  e) an A/D converter for converting a detection signal received from the photodetector into a digital signal; and
  f) an A/D conversion time controller for controlling an A/D conversion time in the A/D converter,
wherein:
  the A/D converter receives, for each period of time equal to the A/D conversion time, detection signals sequentially produced by the photodetector, and sequentially outputs a value corresponding to the amount of signals received over that period of time, and
  the A/D conversion time controller sets the A/D conversion time to a length equal to or longer than five times the cycle of a commercial power supply when a validation of the wavelength correctness of the light separator is performed.

A spectrophotometer according to another aspect of the present invention aimed at solving the previously described problem includes:
  a) a sample container in which a sample is to be placed;
  b) a light source for casting measurement light into the sample container;
  c) a photodetector for detecting light obtained from the sample container as a result of the casting of the measurement light;
  d) a light separator placed on a light path between the light source and the sample container or on a light path between the sample container and the photodetector;
  e) an A/D converter for converting a detection signal received from the photodetector into a digital signal;
  f) an A/D conversion time controller for controlling an A/D conversion time in the A/D converter; and
  g) a determiner for determining, based on the digital signal, whether or not there is a periodic fluctuation of the emission intensity of the light source with time, wherein:
  the A/D converter receives, for each period of time equal to the A/D conversion time, detection signals sequentially produced by the photodetector, and sequentially outputs a value corresponding to the amount of signals received over that period of time, and
  the A/D conversion time controller sets the A/D conversion time to a length equal to or longer than five times the cycle of a commercial power supply when it is determined by the determiner that there is a temporal fluctuation of the emission intensity of the light source.

A spectrophotometer according to still another aspect of the present invention aimed at solving the previously described problem includes:
  a) a light-source unit having a plurality of light sources;
  b) a sample container in which a sample is to be placed;
  c) a light-source selector for selecting a light source to be used for casting light into the sample container from among the plurality of light sources provided in the light-source unit;
  d) a photodetector for detecting light obtained from the sample container as a result of the casting of the light;
  e) a light separator placed on a light path between the light-source unit and the sample container or on a light path between the sample container and the photodetector;
  f) an A/D converter for converting a detection signal received from the photodetector into a digital signal; and
  g) an A/D conversion time controller for controlling an A/D conversion time in the A/D converter,
wherein
  the A/D converter receives, for each period of time equal to the A/D conversion time, detection signals sequentially produced by the photodetector, and sequentially outputs a value corresponding to the amount of signals received over that period of time, and
  the A/D conversion time controller sets the A/D conversion time to a length equal to or longer than five times the cycle of a commercial power supply when the light source selected by the light source selector is a previously specified kind of light source.

As the A/D converter in each of the previously described spectrophotometers according to the present invention, for example, a delta-sigma ($\Delta\Sigma$) A/D converter can be suitably used, although the A/D converter is not limited to this type. For example, an integrating A/D converter can also be used.

Advantageous Effects of the Invention

As described thus far, in the spectrophotometer according to any of the previously described aspects of the present invention, the A/D converter has a variable A/D conversion time, which can be varied through the A/D conversion time controller according to the operation mode of the spectrophotometer (sample measurement mode or wavelength-correctness validation mode), according to whether or not there is a fluctuation of the amount of light emitted from the light source, or according to the kind of light source to be used for the casting of the measurement light. With this system, for example, even when a low-pressure mercury lamp or similar AC-energized light source is used, the influence from the temporal fluctuation of the emission intensity of the light source can be eliminated by increasing the A/D conversion time in the A/D converter and thereby accumulating the signals from the photodetector to a sufficient amount, so that the validation of the wavelength correctness can be accurately performed.

BRIEF DESCRIPTION OF DRAWINGS

FIG. 5 is a graph showing the result of a measurement in which a temporal change in the light intensity of a low-pressure mercury lamp energized with a commercial power supply of 49.9 Hz was measured with an A/D conversion time of 10 ms.

FIG. 6 is a graph showing the result of a measurement in which a temporal change in the light intensity of a low-pressure mercury lamp energized with a commercial power supply of 49.9 Hz was measured with an A/D conversion time of 400 ms.

DESCRIPTION OF EMBODIMENTS

One mode for carrying out the present invention is hereinafter described, giving one embodiment.

Figure 1:
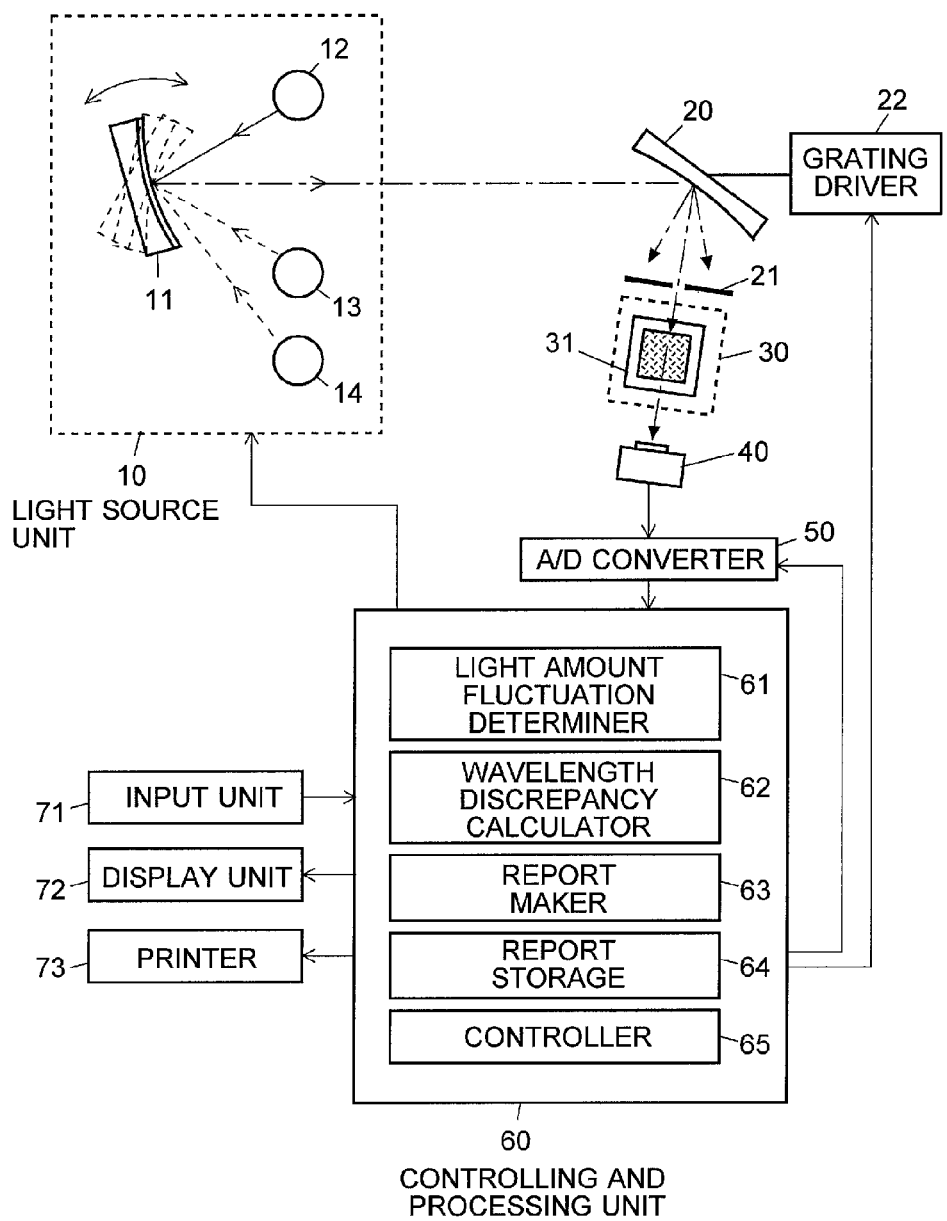
FIG. 1 is a schematic configuration diagram of a spectrophotometer according to one embodiment of the present invention.

FIG. 1 shows a schematic configuration of the spectrophotometer according to the present embodiment. A light-source unit 10 selectively allows light emitted from one of a xenon lamp 12, a deuterium lamp 13 and a low-pressure mercury lamp 14 to be cast onto a diffraction grating 20 by rotating a light-source selecting mirror 11. The light introduced to the diffraction grating 20 is separated into wavelength components by the grating 20. A component of light having a specific wavelength is extracted from the wavelength-dispersed light by a slit 21 and cast onto a sample cell 31 contained in a sample container 30. The intensity (amount) of light which has passed through the sample cell 31 and the sample solution contained in the cell 31 is detected with a photodetector 40, such as a photodiode, and the obtained current signal is sent to an A/D converter 50. The A/D converter 50 integrates the current signal (analogue signal) over a predetermined A/D conversion time, converts the integrated signal into digital data, and sends the data to a controlling and processing unit 60 with a predetermined sampling period.

When the sample solution absorbs the light, the measured value of the amount of light becomes lower than when there is no absorption. The extent of this attenuation depends on the component concentration in the sample solution. Accordingly, by determining the amount of change in the amount of light due to the presence of the component concerned, i.e. the amount of absorbance, with high accuracy, it is possible to determine the quantity of the component in the sample solution. The diffraction grating 20 is rotatable over a predetermined angular range by a grating driver 22 including a motor and other components. Its angle determines the wavelength of the measurement light to be extracted through the slit 21 and cast into the sample cell 31. Therefore, for example, by measuring the intensity of the transmitted light while rotating the diffraction grating 20 in steps of an extremely small preset angle, it is possible to obtain an absorption spectrum in the controlling and processing unit 60.

The controlling and processing unit 60, which is configured including a CPU, memory and other elements, has the following functional blocks: a light amount fluctuation determiner 61, a wavelength discrepancy calculator 62, a report maker 63, a report storage section 64, and a controller 65. The controlling and processing unit 60 generally controls the previously described components as well as performs predetermined processes (e.g. creation of a spectrum) based on the digital data received from the A/D converter 50. An input unit 71 including a keyboard, mouse and other devices to be used by operators, a display unit 72 for showing a measurement result and a validation report (which will be described later), and a printer 73, are connected to the controlling and processing unit 60. The functions of the controlling and processing unit 60 may be embodied by a dedicated computer built in the main body (casing) of the spectrophotometer, or it may be embodied by a personal computer or similar system which is externally connected to the main body and which has a predetermined program installed.

The spectrophotometer according to the present embodiment has the function of measuring the emission intensity of the used light source for a preset period of time, determining whether or not there is a temporal fluctuation of the emission intensity, and based on the result, changing the A/D conversion time to be used by the A/D converter 50 in the validation process, before the validation of the wavelength correctness is performed. When the emission intensity of the light source is measured for the aforementioned determination, the A/D conversion time in the A/D converter 50 is set to be shorter than in the measurement of a sample (specifically, it should be equal to or shorter than one fifth of the cycle of the commercial power supply, and more preferably, equal to or shorter than one tenth).

Figure 2:
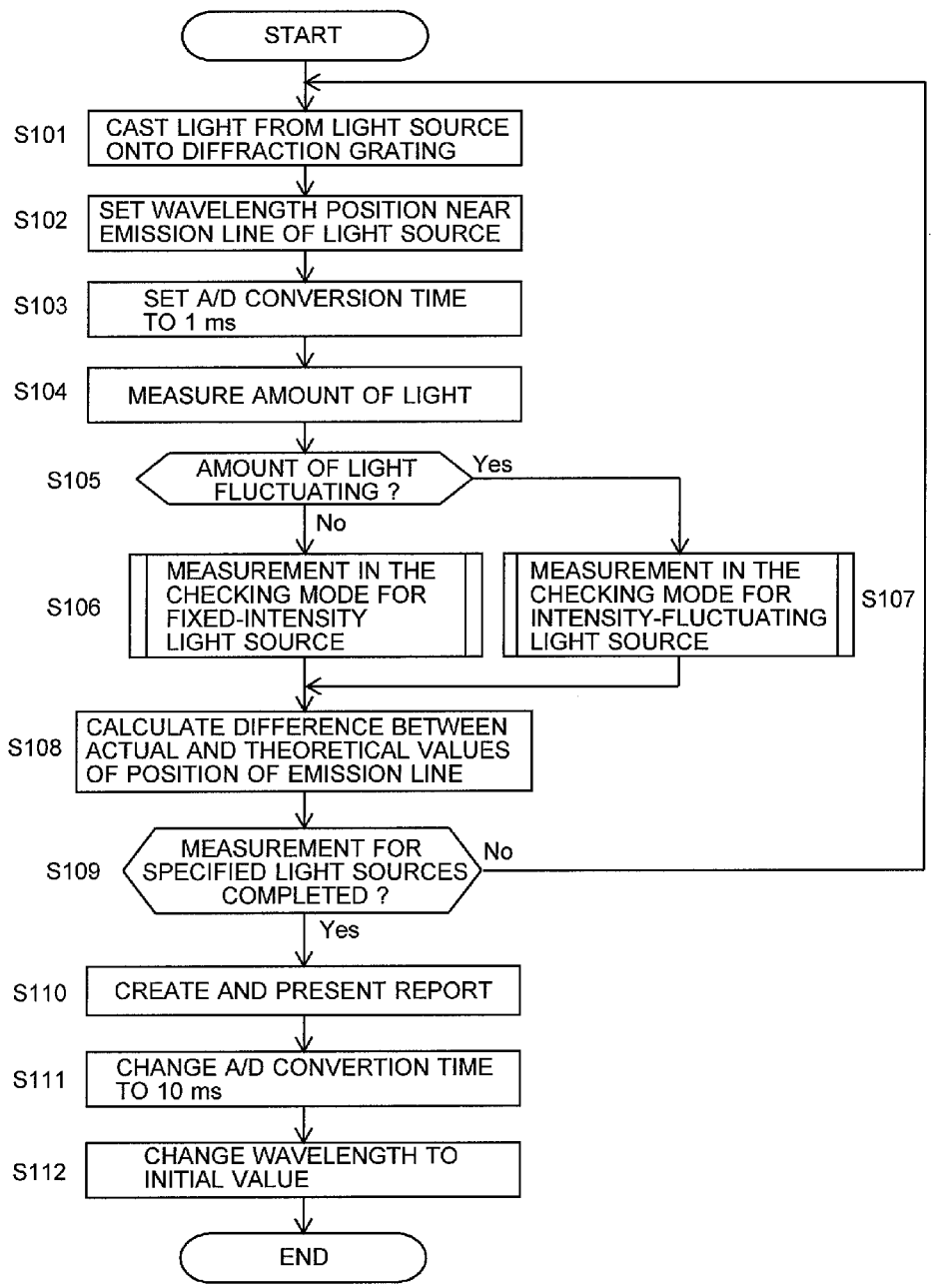
FIG. 2 is a flowchart showing a wavelength-correctness validation procedure by the spectrophotometer of the embodiment.
Figure 3:
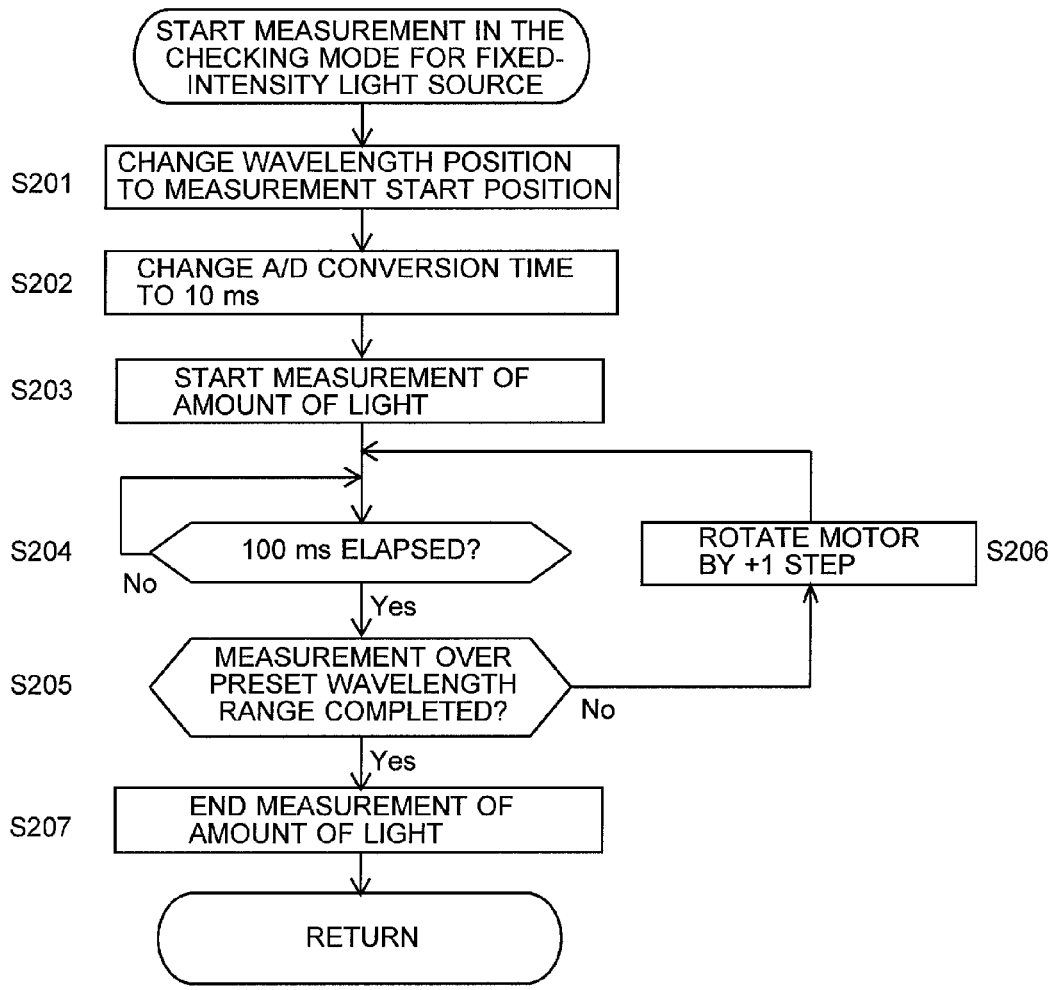
FIG. 3 is a flowchart showing a measurement procedure in a checking mode for a fixed-intensity light source.
Figure 4:
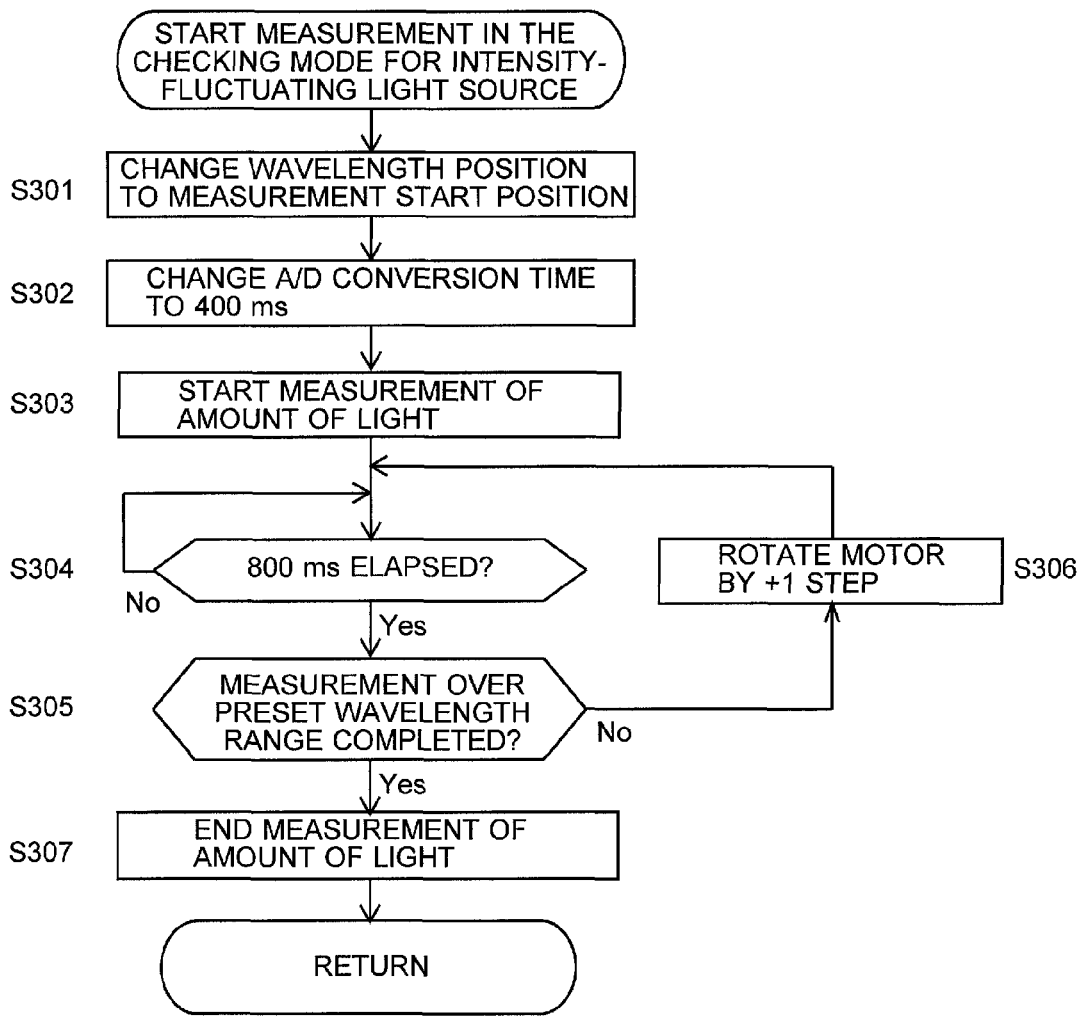
FIG. 4 is a flowchart showing a measurement procedure in a checking mode for an intensity-fluctuating light source.

The procedure for performing the validation of the wavelength correctness is hereinafter described with reference to the flowcharts of FIGS. 2-4. The hereinafter described processes are carried out under the condition that the sample cell 31 is not set in the sample container 30 and the light passing through the slit 21 is allowed to directly enter the photodetector 40 (without being absorbed).

When an operator performs a predetermined operation on the input unit 71 to enter a command for executing the validation, the controller 65 sends the light-source unit 10 a signal for driving the light-source selecting mirror 11 so that light emitted from one of the light sources previously specified as the light sources to be used for the validation of the wavelength correctness (i.e. the deuterium lamp 13 and the low-pressure mercury lamp 14) is made to fall onto the diffraction grating 20 (Step S101). The light source whose emission light is made to fall onto the diffraction grating 20 at this stage may be either the deuterium lamp 13 or the low-pressure mercury lamp 14. In the present description, it is assumed that the light from the deuterium lamp 13 is initially made to fall onto the grating 20. Subsequently, the controller 65 controls the grating driver 22 so as to adjust the angle of the diffraction grating 20 so that the wavelength of the incident light to the photodetector 40 is located close to an emission line of the light source (656 nm in the present case) (Step S102). Then, the controller 65 sets the A/D conversion time in the A/D converter 50 to 1 ms (Step S103), and conducts a measurement of the amount of incident light by the photodetector 40 over a preset period of time (Step S104).

The detection signal (analogue signal) from the photodetector 40 is converted into digital data with the aforementioned A/D conversion time in the A/D converter 50 and sent to the controlling and processing unit 60. In the controlling and processing unit 60, the light amount fluctuation determiner 61 determines, based on the digital data, whether or not the amount of light of the currently lighted lamp is fluctuating with time (Step S105). For example, when the difference between the highest and lowest values of the amount of incident light measured in Step S104 is equal to or greater than a predetermined value, it is determined that the fluctuation is present. Since the DC-energized deuterium lamp 13 is lighted at this stage, the light amount fluctuation determiner 61 determines that there is no temporal fluctuation of the amount of light ("No" in Step S105).

If it is determined in Step S105 that there is no temporal fluctuation of the amount of light of the currently lighted lamp, a measurement in the "checking mode for a fixed-intensity light source" is performed using the lamp (Step S106). The procedure of the checking mode for a fixed-intensity light source is shown in the flowchart of FIG. 3.

In the checking mode for a fixed-intensity light source, the controller 65 initially controls the grating driver 22 so that the wavelength position of the light falling onto the photodetector 40 is brought to the position which has been previously specified as a measurement start position for the currently energized light source (640 nm in the present example) (Step S201). Subsequently, the controller 65 changes the A/D conversion time of the A/D converter 50 to 10 ms (Step S202) and gives a command for initiating the measurement of the amount of incident light by the photodetector 40 (Step S203). In this measurement, the analogue signal produced by the photodetector 40 and sent to the A/D converter 50 is integrated over the aforementioned A/D conversion time (10 ms) in the A/D converter 50. The thereby obtained value (data value) is sent to the controlling and processing unit 60. Such a data value is repeatedly obtained for each 10 ms period. When 100 ms have elapsed from the beginning of the measurement (when "Yes" in Step S204 in FIG. 3), the controller 65 changes the position of the measurement wavelength by rotating a grating drive motor provided in the grating driver 22 in the forward direction by an amount corresponding to one step (Step S206). During the aforementioned 100 ms period, a plurality of data values (ten values) are obtained with the A/D converter 50. However, it takes several tens of milliseconds for the detection signal to be stabilized after the motor is rotated. Therefore, when a spectrum is created (as will be described later), only the data value obtained immediately before the rotation of the motor among the plurality of data values obtained at each position of the measurement wavelength is used as the value of the amount of incident light to the photodetector at that position of the measurement wavelength. Such a process of obtaining data values and changing the wavelength position is repeatedly performed every 100 ms. When the measurement over the specified wavelength range (from 640 to 670 nm in the present example) is completed (i.e. when "Yes" in Step S205 in FIG. 3), the measurement of the amount of light by the photodetector 40 is discontinued (Step S207).

After the measurement in the checking mode for a fixed-intensity light source is completed, the wavelength discrepancy calculator 62 creates a spectrum showing the amount of incident light to the photodetector within the aforementioned wavelength range based on the data values obtained during the measurement, and then calculates the difference between the peak position of the emission line on the spectrum and a theoretical value (656.1 nm in the present case) of the wavelength of the emission line of the light source (Step S108).

Subsequently, the controller 65 determines whether or not the aforementioned measurement has been completed for all the light sources previously specified as the light sources to be used for the wavelength-correctness validation (Step S109). If the measurement is not completed, the operation returns to Step S101 and the processes of Steps S101 through S109 are performed for another light source (in the present example, the low-pressure mercury lamp 14). Specifically, the controller 65 sends the light-source unit 10 a control signal for rotating the light-source selecting mirror 11 so that the light emitted from a light source for which the measurement has not been completed (the low-pressure mercury lamp 14 in the present example) is made to fall onto the diffraction grating 20 (Step S101). Next, the controller 65 controls the grating driver 22 so that the wavelength of the incident light to the photodetector 40 is located close to that of an emission line of the light source (254 nm in the present case) (Step S102). Then, the controller 65 sets the A/D conversion time in the A/D converter 50 to 1 ms (Step S103), and conducts a measurement of the amount of incident light by the photodetector 40 over a preset period of time (Step S104). Based on the result of the measurement, the light amount fluctuation determiner 61 determines, in the previously described way, whether or not the amount of light of the currently energized light source is fluctuating with time (Step S105).

Figure 9:
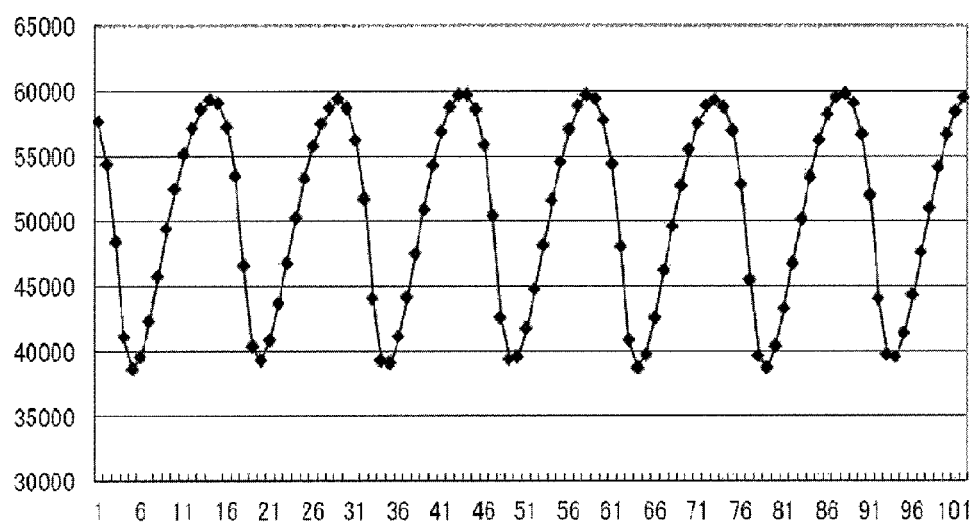
FIG. 9 is a graph showing a temporal change in the emission intensity of a low-pressure mercury lamp.

In this step, if the low-pressure mercury lamp 14 is energized with a 50-Hz commercial power supply, the result of the measurement of the emission intensity of the low-pressure mercury lamp 14 over a predetermined period of time with an A/D conversion time of 1 ms will be as shown in FIG. 9. Accordingly, it is determined by the light amount fluctuation determiner 61 that the currently energized light source has a temporal fluctuation of the amount of light ("Yes" in Step S105), so that a measurement in the "checking mode for an intensity-fluctuating light source" is performed (Step S107). The checking mode for an intensity-fluctuating light source is a mode in which the peak position of an emission line of the light source is measured with the A/D conversion time in the A/D converter 50 set longer than the A/D conversion times used in the checking mode for a fixed-intensity light source and in the measurement of a sample. Specifically, the A/D conversion time in the present mode should be equal to or longer than five times the cycle of the commercial power supply, and more desirably, ten times or longer. The procedure of the checking mode for an intensity-fluctuating light source is shown in the flowchart of FIG. 4.

In the checking mode for an intensity-fluctuating light source, the controller 65 initially controls the grating driver 22 so that the wavelength position of the light falling onto the photodetector 40 is brought to the position which has been previously specified as a measurement start position for the currently energized light source (240 nm in the present example) (Step S301). Subsequently, the controller 65 changes the A/D conversion time in the A/D converter 50 to 400 ms (Step S302) and gives a command for initiating the measurement of the amount of incident light by the photodetector 40 (Step S303). In this measurement, the analogue signal produced by the photodetector 40 and sent to the A/D converter 50 is integrated over the aforementioned A/D conversion time (400 ms) in the A/D converter 50 (Step S304). The thereby obtained value (data value) is sent to the controlling and processing unit 60. Such a data value is repeatedly obtained for each 400 ms period. When 800 ms have elapsed from the beginning of the measurement (when "Yes" in Step S304 in FIG. 4), the controller 65 changes the position of the measurement wavelength by rotating the grating drive motor provided in the grating driver 22 in the forward direction by an amount corresponding to one step (Step S306). During the aforementioned 800 ms period, a plurality of data values (two values) are obtained with the A/D converter 50. However, as explained earlier, it takes several tens of milliseconds for the detection signal to be stabilized after the motor is rotated. Therefore, when a spectrum is created (as will be described later), only the data value obtained immediately before the rotation of the motor among the plurality of data values obtained at each position of the measurement wavelength is used as the value of the amount of incident light to the photodetector at that position of the measurement wavelength. Such a process of obtaining data values and changing the wavelength position is repeatedly performed every 800 ms. When the measurement over the specified wavelength range (from 240 to 268 nm in the present example) is completed (i.e. when "Yes" in Step S305 in FIG. 4), the measurement of the amount of light by the photodetector 40 is discontinued (Step S307).

Thus, when a measurement using the low-pressure mercury lamp 14 is performed in the checking mode for an intensity-fluctuating light source, the amount of light is checked while the motor is rotated over a range which approximately corresponds to 240 nm to 268 nm, so as to detect the 253.7-nm emission line of the low-pressure mercury lamp. This 28-nm wavelength range corresponds to 35 steps in terms of the number of steps of a motor commonly used for driving the diffraction grating 20. Therefore, the previously described process of measuring the amount of light while changing the wavelength position every 800 ms takes approximately 30 seconds (800 ms×35 steps) to completely cover the aforementioned wavelength range. This is an operation time which poses practically no problem.

After the measurement in the checking mode for an intensity-fluctuating light source is completed, the wavelength discrepancy calculator 62 creates a spectrum showing the amount of incident light to the photodetector within the aforementioned wavelength range based on the data values obtained during the measurement, and then calculates the difference between the peak position of the emission line on the spectrum and a theoretical value (253.7 nm in the present case) of the wavelength of the emission line of the light source (Step S108).

The low-pressure mercury lamp 14 cannot only be energized with a commercial power supply in the previously described manner; in some cases, it may also be energized with a radio-frequency alternating current obtained by a frequency transformation of the commercial power supply. For example, when the low-pressure mercury lamp 14 is energized with a radio-frequency alternating current of 30 kHz, the emission intensity of the low-pressure mercury lamp 14 will cyclically fluctuate about 30 times per 1 ms. Therefore, in this case, the waveform obtained by A/D-converting the emission intensity of the low-pressure mercury lamp 14 with a cycle of 1 ms in Step S104 becomes an almost straight line, and the light amount fluctuation determiner 61 determines that the low-pressure mercury lamp 14 has "no fluctuation in the amount of light." Accordingly, the measurement in the checking mode for a fixed-intensity light source is performed (Step S106), and the amount of wavelength discrepancy is calculated based on the measured result (Step S108).

Subsequently, in Step S109, if it is determined that the checking process has been completed for all the light sources previously specified as the light sources to be used for the wavelength-correctness validation, the report maker 63 prepares a validation report showing the difference Δ between the measured value and the theoretical value of each emission line.

If all the values of the difference Δ calculated for the emission lines are within a predetermined range (e.g. within ±1 nm), it is determined that "there is no problem in wavelength correctness" and this result is written in the validation report. If any one of the values of the difference Δ is out of the predetermined range, it is determined that "there is a problem in wavelength correctness" and this result is written in the validation report. The completed validation report is stored in the report storage section 64 and is also presented to the operator by being displayed on the screen of the display unit 72 and/or printed out with the printer 73 (Step S110).

Furthermore, the controller 65 sets the A/D conversion time of the A/D converter 50 to 10 ms (a value applied in a usual analysis of a sample) (Step S111), controls the grating driver 22 to reset the wavelength position to the initial value (Step S112), and discontinues the entire sequence of validation.

As described thus far, in the spectrophotometer according to the present invention, when the validation of the wavelength correctness is performed, the A/D conversion time of the A/D converter is automatically changed according to whether or not there is a fluctuation of the emission intensity of the light source. FIGS. 5 and 6 show the result of a measurement conducted to confirm the effect of this function, in which the emission intensity of a low-pressure mercury lamp was measured for different values of the A/D conversion time of the A/D converter. In both cases, the temporal change in the light intensity of a low-pressure mercury lamp energized with a commercial power supply of 49.9 Hz was measured at a wavelength of 254 nm. The A/D conversion time was set at 10 ms in the case of FIGS. 5 and 400 ms in the case of FIG. 6. As can be seen in these figures, the light intensity measured with an A/D conversion time of 10 ms showed a significant fluctuation of 19% pp (peak-to-peak), while the fluctuation was suppressed to 1% pp or less when the sampling time was set to 400 ms.

Figure 7:
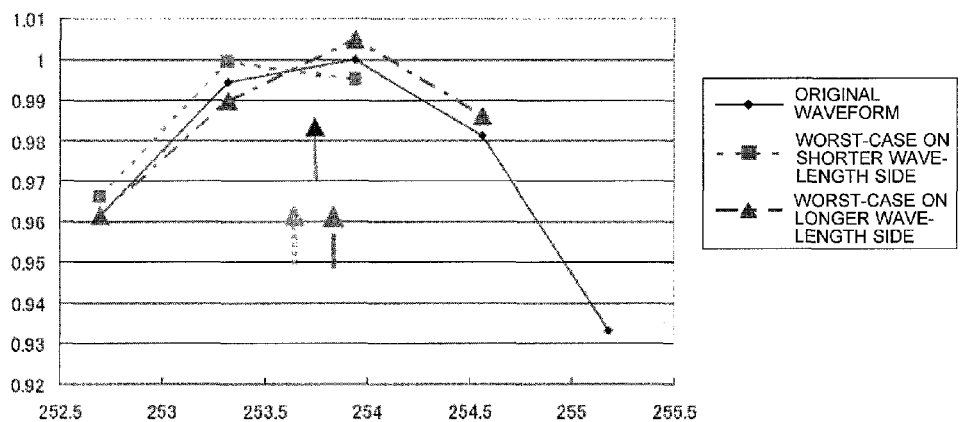
FIG. 7 is a graph showing the result of a simulation in which a 1% change in the light intensity was converted to the amount of discrepancy in the peak wavelength.
Figure 8:
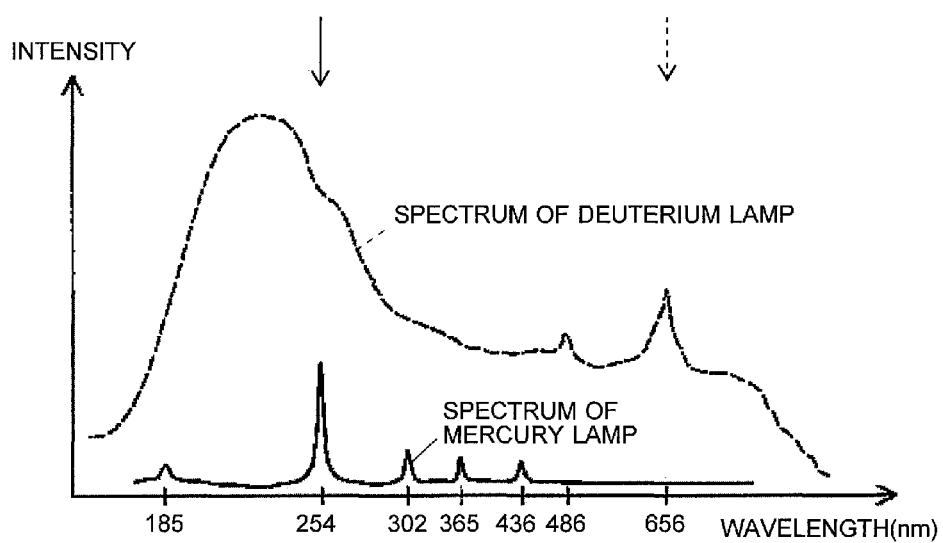
FIG. 8 shows energy spectra of a deuterium lamp and a low-pressure mercury lamp.

FIG. 7 shows the result of a simulation performed for converting the intensity fluctuation of 1% pp (=±0.5%) into a wavelength error. In this figure, the "original waveform" shows actually measured values of the emission spectrum of the low-pressure mercury lamp, while the "worst-case waveform on shorter wavelength side" and the "worst-case waveform on longer wavelength side" are waveforms in the case where the peak-top position was most extremely shifted on the shorter-wavelength side or the longer wavelength side, respectively, when the value of each point on the original waveform was changed within a range of ±0.5%. The arrows in the figure indicate the peak-top positions derived from the values of the points on the waveforms. The difference between the peak-top position of the worst-case waveform on shorter wavelength side and that of the worst-case waveform on longer wavelength side was 0.16 nm. This result demonstrates that the intensity change of 1% pp is 0.16 nm in terms of the wavelength error. That is to say, it is possible to deduce that, in the spectrophotometer according to the present embodiment, the wavelength error in the detection of the emission line of the low-pressure mercury lamp is decreased to 0.16 nm or less when the A/D conversion time in the A/D convertor is set to 400 ms. (It should be noted that the aforementioned simulation shows the worst-case scenario; the error is expected to be 0.1 nm or less in actual operations.) This accuracy is sufficiently high for the checking of a wavelength correctness of ±1 nm.

By contrast, as already noted, when the A/D conversion time is set to 10 ms as in the validation of the conventional spectrophotometer, the emission intensity of the mercury lamp shows a fluctuation of 19% pp. Converting this intensity fluctuation into the wavelength error in the previously described way results in an error equal to or greater than 1 nm, which suggests that the conventional setting is unsuitable for the checking of a wavelength correctness of ±1 nm.

Thus far, one mode for carrying out the present invention has been described, giving an embodiment. The present invention is not limited to the previous embodiment; it can be appropriately modified within the spirit of the present invention. For example, in the previous embodiment, the A/D conversion time in the measurement of the emission-line position is determined according to whether or not there is a fluctuation of the light intensity of each light source. However, the determining method is not limited to this one; for example, the A/D conversion time may also be determined according to the kind of light source, or it may be determined according to the operation mode. In the former case, for example, the A/D conversion is performed with a comparatively long A/D conversion time (equal to or longer than five times the cycle of the commercial power supply, and more preferably, ten times or longer) when the low-pressure mercury lamp is lighted, while the A/D conversion is performed with a comparatively short A/D conversion time when the deuterium lamp is lighted. In the latter case, for example, when the validation of the wavelength correctness is performed, the A/D conversion with the aforementioned comparatively long A/D conversion time is always performed regardless of the kind of light source used, whereas, when a measurement of a sample is performed, the A/D conversion with the aforementioned comparatively short A/D conversion time is always performed.

Furthermore, in place of, or in addition to, the light separator (the diffraction grating 20 coupled with the slit 21) provided on the light path between the light-source unit and the sample container in the previous embodiment, a light separator may be provided on the light path between the sample container and the photodetector.

The spectrophotometer described in the previous embodiment is designed to be independently used. It is also possible, for example, to apply the present invention in a spectrometer to be used as a detector for a liquid chromatograph. Furthermore, the present invention cannot only be applied in a spectrophotometer for measuring absorbance (i.e. an absorptiometer) as in the previous embodiment, but also in various kinds of spectrometers, such as a fluorescence spectrophotometer or a Fourier transform infrared spectrophotometer.

REFERENCE SIGNS LIST

10 . . . Light-Source Unit
11 . . . Light-Source Selecting Mirror
12 . . . Xenon Lamp
13 . . . Deuterium Lamp
14 . . . Low-Pressure Mercury Lamp
20 . . . Diffraction Grating
21 . . . Slit
22 . . . Grating Driver
30 . . . Sample Container
31 . . . Sample Cell
40 . . . Photodetector
50 . . . A/D Converter
60 . . . Controlling and Processing Unit
61 . . . Light Amount Fluctuation Determiner
62 . . . Wavelength Discrepancy Calculator
63 . . . Report Maker
64 . . . Report Storage Section
65 . . . Controller
71 . . . Input Unit
72 . . . Display Unit
73 . . . Printer

The invention claimed is:

1. A spectrophotometer comprising:
   a) a sample container in which a sample is to be placed;
   b) a light source for casting measurement light into the sample container;
   c) a photodetector for detecting light obtained from the sample container as a result of the casting of the measurement light;
   d) a light separator placed on a light path between the light source and the sample container or on a light path between the sample container and the photodetector;
   e) an A/D converter for converting a detection signal received from the photodetector into a digital signal;
   f) an A/D conversion time controller for controlling an A/D conversion time in the A/D converter; and
   g) a determiner for determining, based on the digital signal, whether or not there is a periodic fluctuation of an emission intensity of the light source with time, wherein:
   the A/D converter receives, for each period of time equal to the A/D conversion time, detection signals sequentially produced by the photodetector, and sequentially outputs a value corresponding to an amount of signals received over that period of time, and
   when a validation of a wavelength correctness of the light separator is performed by using a light source which is driven by a commercial AC power supply and it is determined by the determiner that there is a temporal fluctuation of the emission intensity of the light source, the A/D conversion time controller sets the A/D conversion time to a length equal to or longer than five times a cycle of the commercial AC power supply.

2. A spectrophotometer comprising:
   a) a light-source unit having a plurality of light sources;
   b) a sample container in which a sample is to be placed;
   c) a light-source selector for selecting a light source to be used for casting light into the sample container from among the plurality of light sources prodded in the light-source unit;
   d) a photodetector for detecting light obtained from the sample container as a result of the casting of the light;
   e) a light separator placed on a light path between the light-source unit and the sample container or on a light path between the sample container and the photodetector;
   f) an A/D converter for converting a detection signal received from the photodetector into a digital signal; and
   g) an A/D conversion time controller for controlling an A/D conversion time in the A/D converter, h) a determiner for determining, based on the digital signal, whether or not there is a periodic fluctuation of an emission intensity of the light source with time, wherein the A/D converter receives, for each period of time equal to the A/D conversion time, detection signals sequentially produced by the photodetector, and sequentially outputs a value corresponding to an amount of signals received over that period of time, and when a validation of a wavelength correctness of the light separator is performed by using a light source which is driven by a commercial AC power supply and is a previously specified kind of light source and it is determined by the determiner that there is a temporal fluctuation of the emission intensity of the light source, the A/D conversion time controller sets the A/D conversion time to a length equal to or longer than five times a cycle of the commercial AC power supply.

* * * * *